United States Patent [19]

Hisamura

[11] Patent Number: 5,678,188
[45] Date of Patent: Oct. 14, 1997

[54] EMERGENCY MESSAGE COMMUNICATION METHOD

[75] Inventor: Masayuki Hisamura, Tokyo, Japan

[73] Assignee: Sony Corporation, Tokyo, Japan

[21] Appl. No.: 305,148

[22] Filed: Sep. 13, 1994

[30] Foreign Application Priority Data

Sep. 14, 1993 [JP] Japan .................... 5-252459

[51] Int. Cl.$^6$ .................... H04B 7/26; H04Q 7/38
[52] U.S. Cl. .................... 455/34.1; 455/54.1; 455/58.1; 379/59
[58] Field of Search ................ 455/33.1, 34.1, 455/34.2, 54.1, 54.2, 58.1, 62, 67.1; 379/59; 375/205; 370/18, 84

[56] References Cited

U.S. PATENT DOCUMENTS

| 4,780,715 | 10/1988 | Kasugai | 455/54.2 |
| 4,788,543 | 11/1988 | Rubin | 455/58.1 |

FOREIGN PATENT DOCUMENTS

| 0133316 | 11/1978 | Japan | 455/58.1 |
| 0039426 | 3/1980 | Japan | 455/34.2 |
| 0160737 | 8/1985 | Japan | 455/58.1 |
| 0288028 | 11/1989 | Japan | 455/58.1 |
| 3050996 | 3/1991 | Japan | 455/58.1 |
| 4199919 | 7/1992 | Japan | 455/34.1 |

*Primary Examiner*—Reinhard J. Eisenzopf
*Assistant Examiner*—Nguyen Vo
*Attorney, Agent, or Firm*—Limbach & Limbach L.L.P.

[57] ABSTRACT

An emergency message communication method which enables communication by disregarding channel shortages in emergency message communication. Even if no talking channel is empty or if voice communication is impossible due to system power capacity saturation for a mobile station transmitting an emergency call, the present invention enables emergency message communication that connects the emergency call preferentially by temporarily stopping traffic channel communication for other mobile stations and reducing power use with a lower voice rate.

9 Claims, 6 Drawing Sheets

EMERGENCY MESSAGE COMMUNICATION METHOD

BACKGROUND OF THE INVENTION

Field Of The Invention

The present invention relates to an emergency message communication method and is applicable to, for example, prioritization in a cellular system adopting code division multiple access (CDMA).

Heretofore, some cellular systems have used multiaccess communication adopting CDMA to prevent influences from multipath fading, markedly improving the efficiency of frequency use, and easily increasing user capacity (PCT international application number: PCT/US90/06417, International publication number: WO91/07036).

The CDMA cellular system uses frequency channels such as pilot, access, sync, paging, and traffic channels for synchronization, the transferred data type, the object, etc., and communicates via spectrum diffusion. Of these, the traffic channel is assigned to voice and data communication, specifically, voice signals are sent through a forward traffic channel from a base station to a mobile station while voice signals are sent through a reverse traffic channel from the mobile station.

System capacity in CDMA is determined by a simultaneously usable maximum channel number (physical channel number) and the usable power capacity for the entire system. Because spectrum diffusion is used, the usable power for the entire system can be calculated by adding the power used in each channel. If a physical channel shortage arises or system power capacity saturates, communication cannot be started.

Voice communication uses a variable-rate voice encoder/decoder (vocoder), so a low voice rate is applied for communication when voice energy is low and a high voice rate is applied for communication when voice energy is high. System power consumption can thus be reduced and noise to other mobile stations minimized. The system capacity is fifteen to twenty times that of the analog capacity and six to seven times that of time division multiple access (TDMA) in digital methods.

In the CDMA cellular system mentioned above, if no empty traffic channel is available or power capacity saturates, the line cannot be connected in calling, even in cases of emergency calls. Hence, the user attempting to make the emergency call must simply wait until the end of the call from some other mobile station and then try his emergency call again.

SUMMARY OF THE INVENTION

In view of the foregoing, an object of this invention is to provide an emergency message communication method that effectively enables emergency message communication regardless of a lack of empty channels.

The foregoing object and other objects of the invention have been achieved through an emergency message communication method for communicating an emergency message through a cellular system communicating voice or data among mobile stations 30 to 36 in any one of the service areas 20, 21, and 22 of a plurality of base stations 10, 11, and 12 or terminal stations included in another public network. The method comprises emergency call processing SP0 for transmitting an emergency message in mobile stations 30 to 36 of the cellular system, a traffic channel shortage procedure SP13, which includes terminal number memory processing for storing terminal numbers of mobile stations 30 to 33 which are in the service area 20 of a base station 10 in the terminal number register 210 in the base station 10 of the cellular system, selection processing means for selecting at least one of the mobile stations 30 to 33 in nonemergency communication when an emergency message is received in the base station 10 of the cellular system, and talking channel restriction processing means for restricting talking channel communication to the mobile stations 30 to 33 in nonemergency communication in the base station 10 of the cellular system. The entire system thus is capable of enabling the communication of an emergency message regardless of a lack of empty channels.

Even if there is no empty talking channel or if voice communication is impossible due to saturated system power capacity despite transmission of an emergency call from the mobile stations 30 to 33, it is possible to connect the emergency call in a higher priority by selecting and restricting talking channel communication in the mobile stations 30 to 33 which are involved with nonemergency communications. Also, the invention lessens the burdensome affect on the users of mobile stations 30 to 33 by making it possible to restart voice communication soon after one of the talking channels becomes empty, because the mobile stations 30 to 33 which have stopped talking channel communication can restart voice communication soon after one of the talking channels becomes empty, and by restricting voice rate on a level free of aural problems by restricting voice rate through changing an object each frame.

As mentioned above, in a cellular system, the invention enables emergency message communication that connects a line certainly and preferentially, since the cellular system disregards a talking channel or system power shortage which would manually prevent emergency message communication.

Further, because the invention neither disconnects lines of other mobile stations through preferentially connecting the emergency call, nor deteriorates the sound quality, the mobile stations forced to temporarily stop traffic channel communication can restart voice communication soon after one of the talking channels becomes empty, and the invention does not heavily burden users, thus, maintaining a comfortable environment.

The nature, principle and utility of the invention will become more apparent from the following detailed description when read in conjunction with the accompanying drawings in which like parts are designated by like reference numerals or characters.

DETAILED DESCRIPTION OF PREFERRED EMBODIMENTS

Preferred embodiments of this invention will be described with reference to the accompanying drawings.

Figure 1:
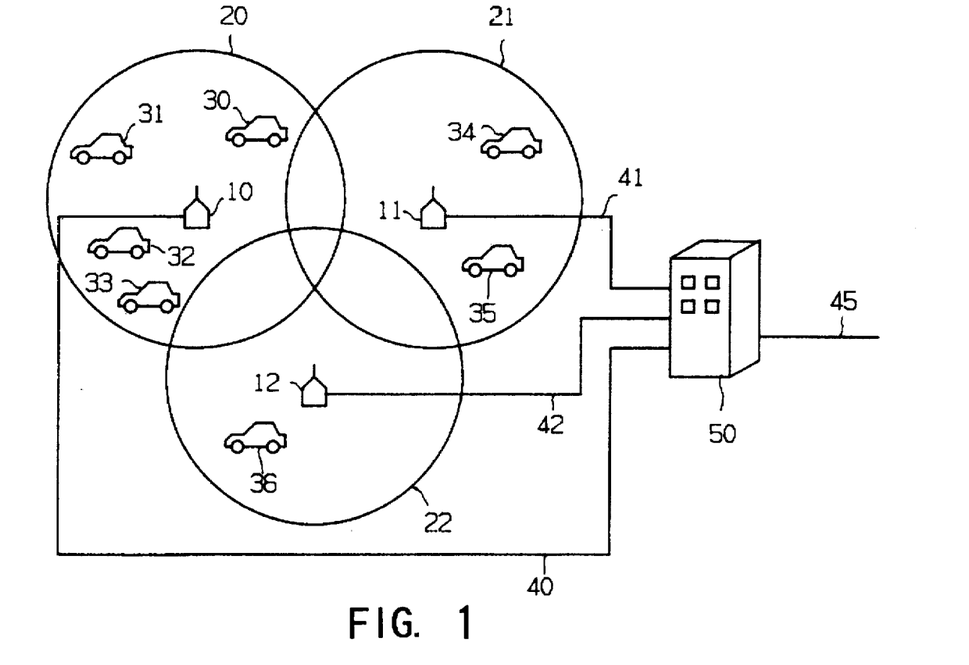
FIG. 1 is a schematic diagram showing the CDMA cellular system using an emergency message communication method according to the present invention.

FIG. 1 generally shows the CDMA cellular system configuration, where base stations 10, 11 and 12 are responsible for wireless communication in service areas 20, 21 and 22. The base station 10, for example, is responsible for wireless communication with mobile stations 30, 31, 32 and 33 in the service area 20. If the mobile station 33 moves from the service area 20 to another service area 22, the responsible base station is changed, i.e., "handed off." After that, the base station 12 is responsible for the mobile station 33.

Base stations 10, 11 and 12 are connected to a control center 50 through connecting lines 40, 41 and 42. Because the control center 50 is also connected to a public line 45, communication transmitted from the mobile station 34, for example, is sent from the responsible base station 11 through the control center 50 to a base station where the mobile station for receiving communication is, to a control center in another area over the public line, or to a central telephone exchange.

Figure 2:
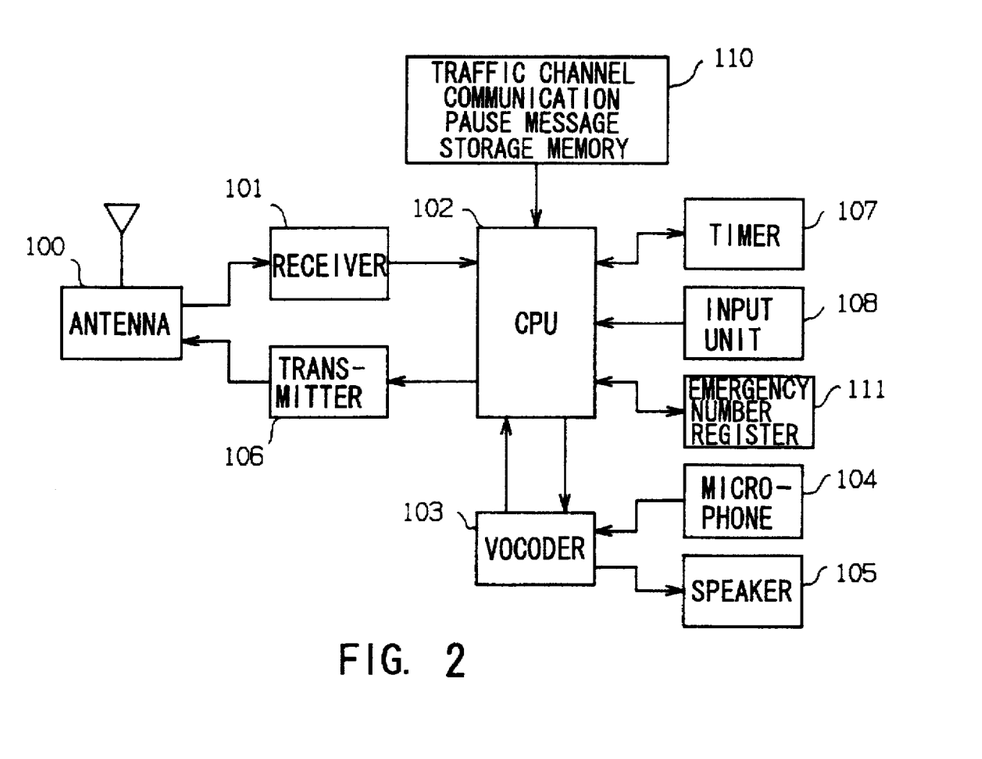
FIG. 2 is a block diagram showing the mobile station configuration enabling the emergency message communication method according to the present invention.
Figure 3:
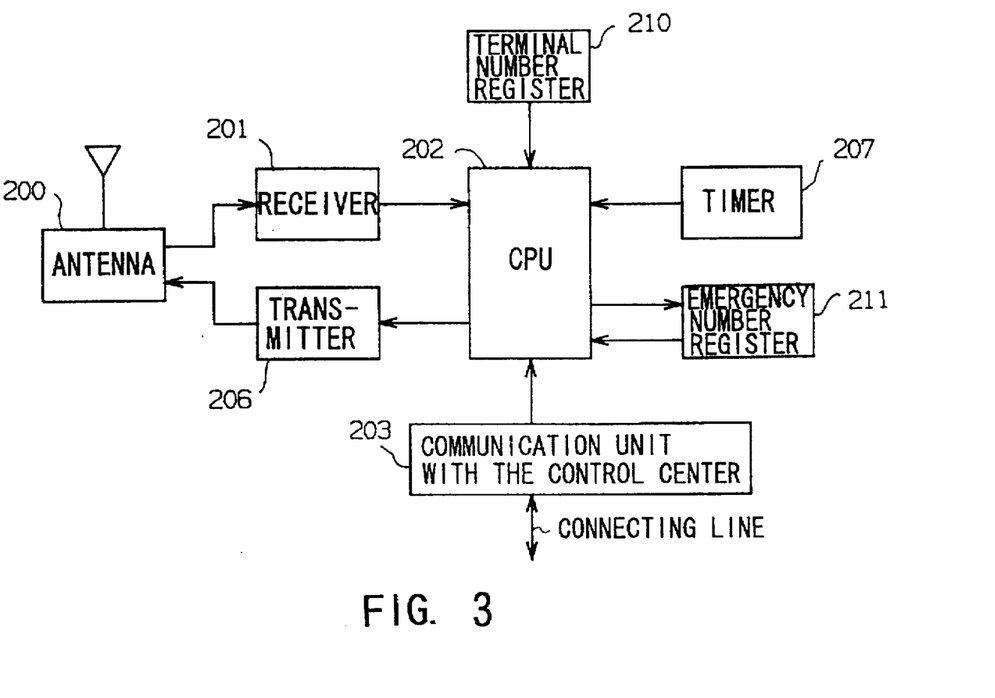
FIG. 3 is a block diagram showing the base station configuration enabling the emergency message communication method according to the present invention.
Figure 4:
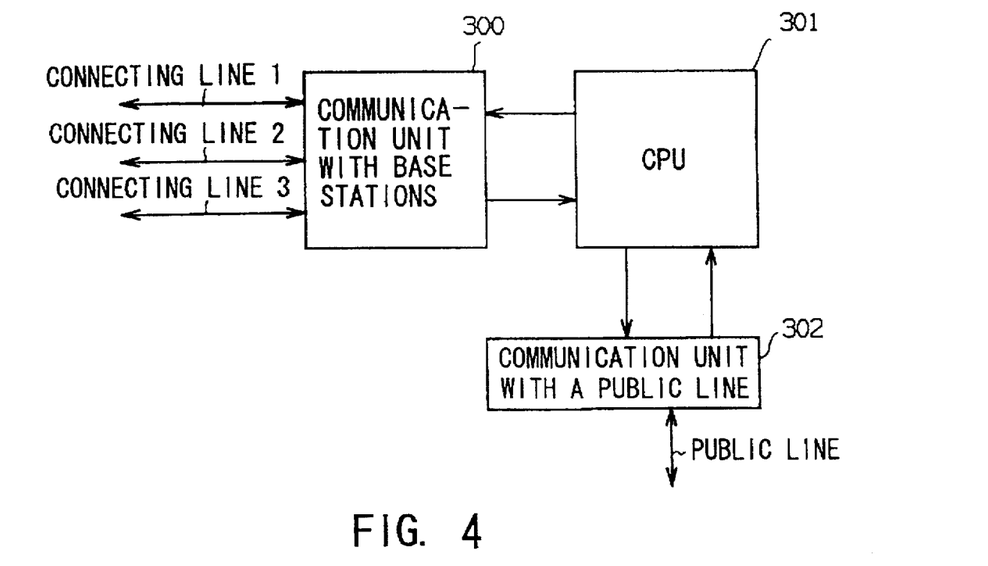
FIG. 4 is a block diagram showing the control center configuration enabling the emergency message communication method according to the present invention.

In this embodiment, mobile stations, base stations, and control centers are configured as shown in FIGS. 2, 3 and 4 for enabling emergency message communication. The signal flow in a mobile station comprises the steps of receiving a signal, called a message and which includes voice signals and communication information, with an antenna 100 and a receiver 101, resolving and analyzing the message with the central processing unit (CPU) 102, and performing necessary processing such as providing received voice data to a vocoder 103. When the vocoder 103 receives voice data from the CPU 102, the vocoder decodes it, and generates a voice with a speaker 105.

Further, the vocoder 103 encodes an analog voice received from microphone 104 in sampling and provides encoded voice data to the CPU 102 as requested. The CPU 102 receiving encoded voice data from the vocoder 103 adds necessary data, converts the data to a predetermined message format, outputs it to a transmitter 106, and transmits a processed message through an antenna 100 to the base station.

The base station is similar to signal flow in a mobile station. Specifically, signal flow in the base station comprises the steps of receiving a message with an antenna 200 and a receiver 201, resolving and analyzing the message with a CPU 202, and outputting necessary information, such as voice data, to a control center and communication unit 203. The communication unit 203 communicates information with a control center and provides necessary information to the CPU 202.

Because the communication unit 203 for communicating with the control center includes a vocoder, encoded voice data received from the CPU 202 is communicated as analog voice signals after decoding and, hence, compatibility is maintained with other existing communication systems. Because the voice signal received from the control center is analog, the voice signal is provided for the CPU 202 after encoding by the communication unit 203 for communicating with the control center. The CPU 202 receiving information from the communication unit 203 for communicating with the control center generates a message and outputs the message to a transmitter 206. The message is transmitted through the antenna 200 to a mobile station.

The signal flow in the control center comprises a communication unit 300 for communicating with base stations connected through lines communicating with base stations, a CPU 301 which performs required processing and provides necessary information to a communication unit 302 for communicating with a public line if the public circuit must be used, or to the communication unit 300 for communicating with base stations if the public line is not necessary. In a CDMA cellular system, basic processing such as reception, analysis, processing, response editing, and transmission is performed in a minimum time unit of 20 ms. This 20 ms of time partition is called a frame, with a one-to-one correspondence maintained between base and mobile stations.

The cellular system of this embodiment executes an emergency call procedure SP0 (FIG. 5), an emergency receipt procedure SP10 (FIG. 6), and a traffic channel communication pause procedure SP20 (FIG. 8), so that this system can effectively communicate an emergency message while enabling communication despite a lack of empty channels for emergency message communication.

In detail, emergency call processing in a mobile station comprises the steps of entering at step SP0 (FIG. 5), completing the usual transmission preparation at step SP1, and determining whether or not the call is an emergency call at subsequent step SP2. This determination data is, for example, whether an emergency button equipped in a terminal input unit 108 is pressed, or whether the transmitted telephone number is an emergency number registered in a terminal emergency register 111. A number determined to be an emergency number is compared with emergency numbers registered in the terminal emergency register 111 in the mobile station and common emergency numbers, registered in the emergency number register 211 in the base station. If it is not an emergency call, processing proceeds to step SP8, and the call is processed as usual communication.

Figure 5:
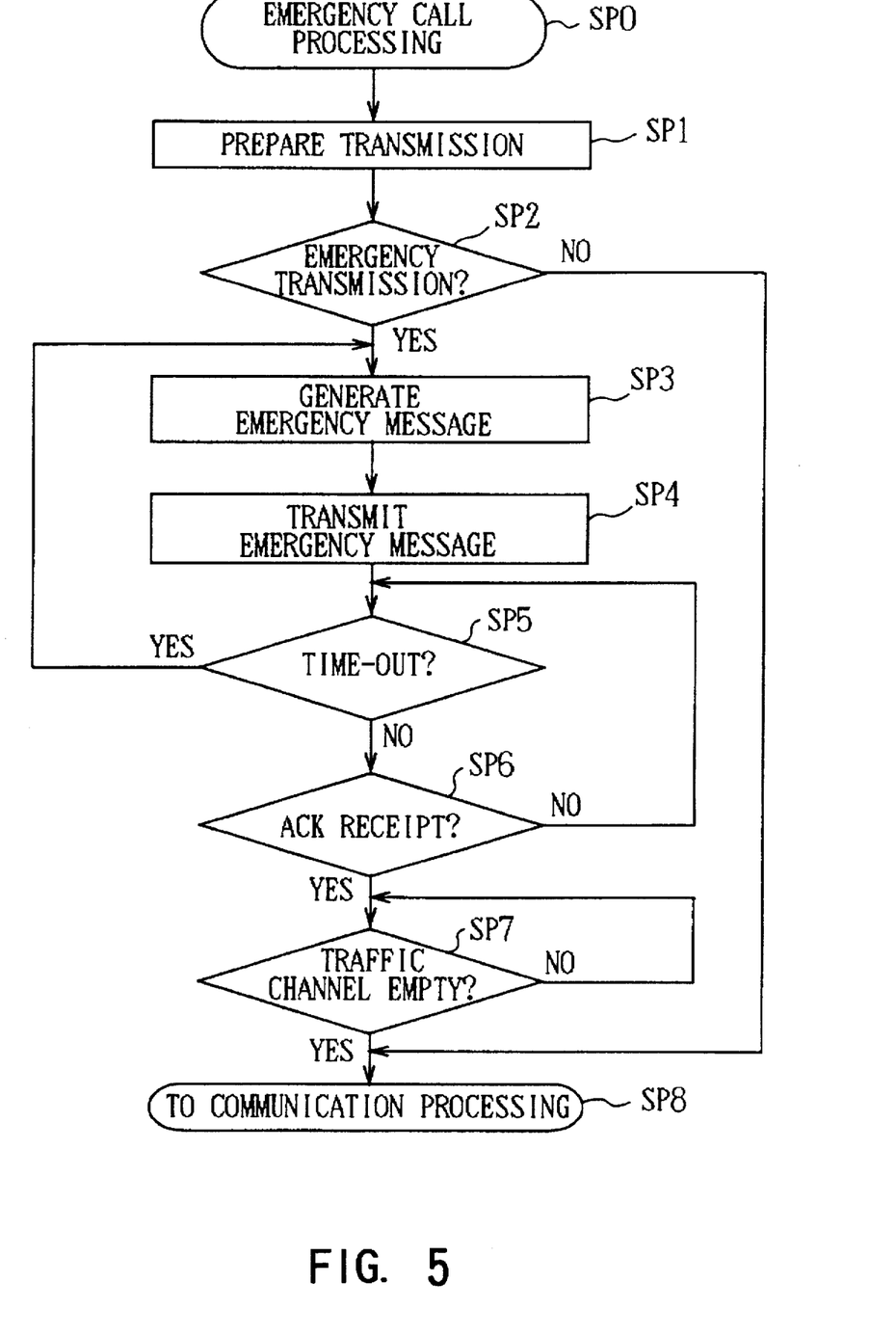
FIG. 5 is a flowchart showing the emergency call procedure from a mobile station in the emergency message communication method according to the invention.

When the call is an emergency, an emergency message is generated at subsequent step SP3, and this emergency message is transmitted from the mobile station at subsequent step SP4. The emergency message includes only a code showing that the message related to the call hereafter transmitted is an emergency. If an acknowledgment (ACK) signal for this emergency signal message cannot be received from the base station at subsequent step SP6 until a certain time, predetermined by a timer 107 at step SP5, elapses a time-out is determined at step SP5, processing is returned to step SP4, and the emergency signal message is transmitted again.

When the ACK signal from the base station can be received at step SP6, it is repeatedly detected at SP7 whether there is an empty traffic channel until a traffic channel becomes empty. When the traffic channel becomes empty, processing proceeds to step SP8, and communication is started. Although overcapacity prevents communication if there is no empty traffic channel at step SP7, this embodiment waits until a channel becomes empty; during this period, the base station makes a channel empty, enabling communication.

Figure 6:
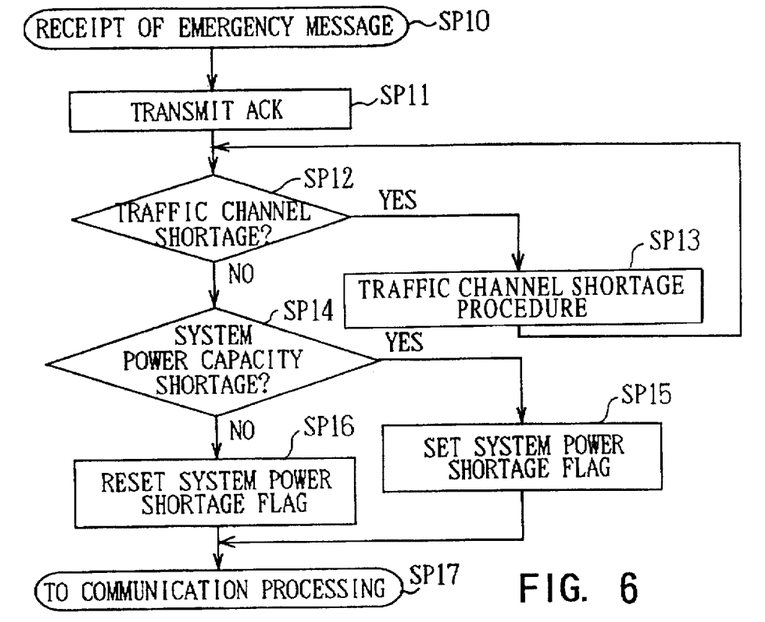
FIG. 6 is a flowchart showing the emergency message receipt procedure from a base station in the emergency message communication method according to the present invention.

The base station receiving the emergency message signal transmitted at step SP4 of the emergency call procedure SP0 executes an emergency receipt procedure SP10 (FIG. 6). In detail, the base station transmits an ACK signal at step SP11 just after receiving the emergency signal message at step SP10, and informs the mobile station transmitting the emergency call of recognition of the emergency signal message in the base station.

At the base station, the CPU determines, whether or not there are sufficient traffic channels at step SP12. If the CPU determines that the channels available are not sufficient, processing proceeds to step SP13. At step SP13, the CPU executes the traffic channel shortage procedure (FIG. 7), and processing returns to step SP12. If the CPU determines that there are sufficient empty traffic channels at step SP12, the CPU then confirms if power used by the system is not over the system power capacity at subsequent step SP14.

Whether or not a margin in the system power capacity exists can be calculated with the number of mobile stations serviced by the base station and the number of mobile stations serviced by the peripheral base stations. If there is no margin, the CPU sets a system power shortage flag at step SP15, and the system power capacity shortage is supplemented through the procedure described below at step SP40 which is implemented if the power shortage flag has been set. If there is a margin in the system power capacity, the system power shortage flag is reset at step SP16, and processing proceeds from SP17 to communication.

Moreover, if the CPU determines that the available traffic channels are insufficient, the traffic channel shortage procedure SP13 (FIG. 7) is executed. In this case, because traffic channels should be physically maintained, the CPU selects a mobile station not transmitting an emergency call from among mobile stations in its own service area registered beforehand in the terminal number register 210 in the base station (FIG. 3) at step SP131.

Figure 7:
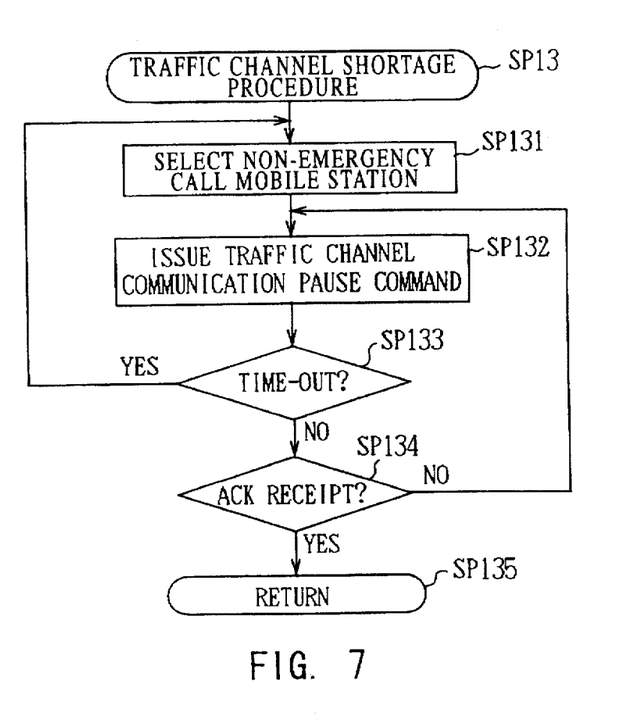
FIG. 7 is a flowchart showing the traffic channel shortage procedure in the emergency message communication method according to the present invention.

This selection disregards the method either corresponding to the service grade or selecting at random. The base station issues the traffic channel communication pause command to the selected mobile station at step SP132. The traffic channel communication pause command is, for example, a message including only the code indicating it.

After this step, because the mobile station responds to an ACK signal when it recognizes the command, the base station waits for an ACK signal from the selected mobile station. If the base station cannot receive the ACK signal from the selected mobile station after the predetermined constant time elapses on a timer 207, time-out is determined at step SP133, processing is returned to step SP131, and the base station selects a new non-emergency call mobile station. If the base station can receive the ACK signal, processing is returned from step SP135 to step SP12 of emergency message receipt procedure SP10.

A traffic channel communication pause procedure SP20 (FIG. 8) is executed in the mobile station selected at step SP131 of the traffic channel shortage procedure SP13 which has transmitted a traffic channel communication pause command at step SP132. Namely, when the mobile station receives the traffic channel communication pause command at step SP20, the mobile station pauses in traffic channel communication at step SP21, releases the traffic channel at step SP22, and transmits an ACK signal to the base station at step SP23, i.e., informs the base station that the procedure has been completed.

Figure 8:
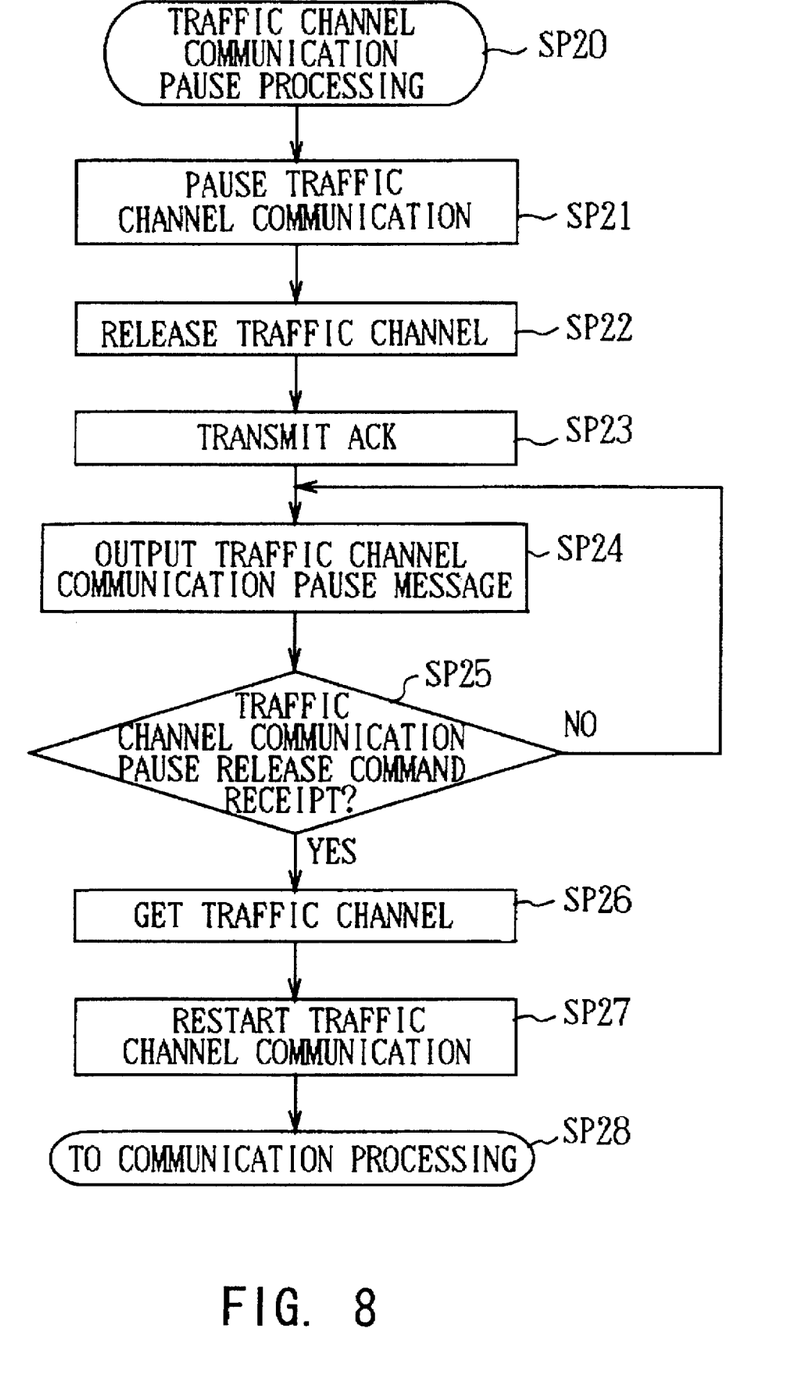
FIG. 8 is a flowchart showing the traffic channel communication pause procedure in the emergency message communication method according to the present invention.

Because traffic channel communication has paused, voice also suddenly pauses for the user, so the mobile station outputs a traffic channel communication pause message at subsequent step SP24 to inform the user that voice communication has paused due to an emergency call. This traffic channel communication pause message is saved in a coded format in the traffic channel communication pause message save memory 110 (FIG. 2) of a mobile station. Such a message might be a voice information which tells the user: "Please hold while this line is used for an emergency message."

At step SP24, the mobile station outputs only data corresponding to a regular frame, which is output repeatedly until the mobile station can receive the traffic channel communication pause release command at step SP25. When the mobile station receives the traffic channel communication pause release command at step SP25, the mobile station gets a traffic channel again at subsequent step SP26, restarts traffic channel communication at step SP27, and communicates after step SP28.

Figure 9:
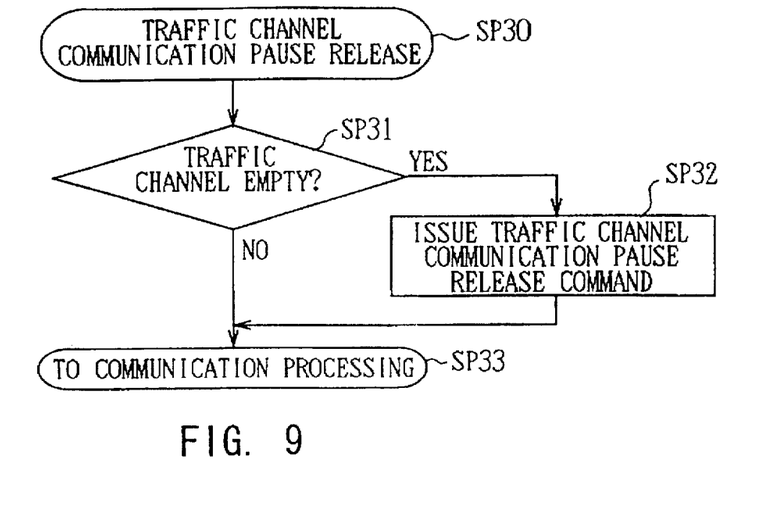
FIG. 9 is a flowchart showing the traffic channel communication pause release procedure in the emergency message communication method according to the present invention.

In the case of this embodiment, when the base station conducts usual communication, the base station executes the traffic channel communication pause release procedure SP30 (FIG. 9) and the system power shortage flag on procedure SP40 (FIG. 10) through flag processing. The traffic channel communication pause release procedure SP30 pauses each one or few frames if a mobile station is pausing in traffic channel communication. Namely, the base station examines, at step SP31, whether a traffic channel is empty and, if not, the base station continues communication after step SP33. If a channel is empty, the base station issues the traffic channel communication pause release command to the mobile station at SP32, which enables the mobile station to go restart traffic channel communication. A traffic channel communication pause release command is also issued at SP32 if the mobile station moves out of the service area where it first received the traffic channel communication pause command.

Figure 10:
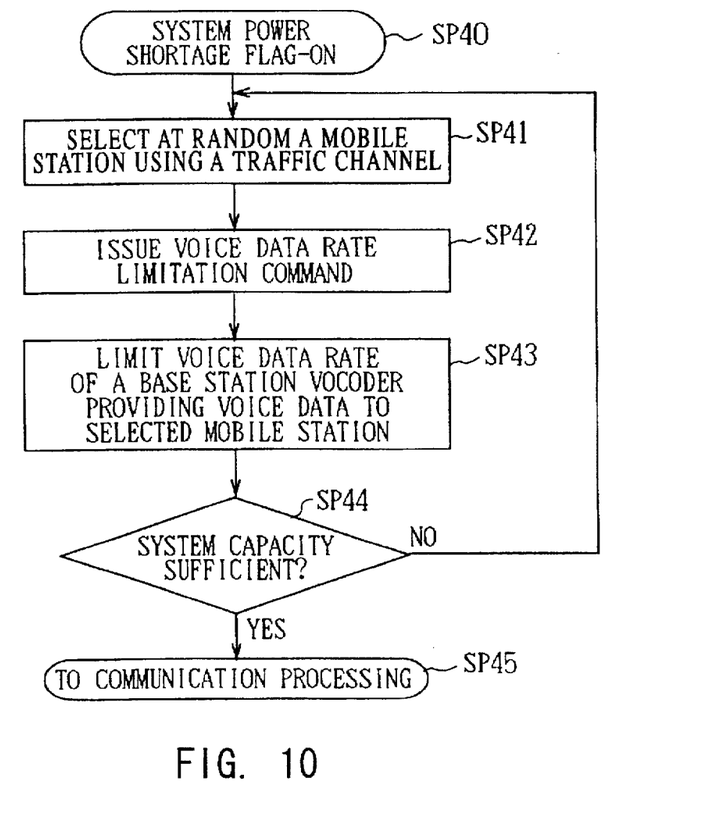
FIG. 10 is a flowchart showing the system power flag on procedure in the emergency message communication method according to the present invention.

The system power shortage flag on procedure SP40 is executed when the system power shortage flag set at step SP15 is set after the base station determines at step SF14 of the emergency message receipt procedure SP10 that system power has saturated. If the system power shortage flag is set, this processing is done each one or few frames. As the base station switches the restricted object even a short time such as this, terminal users at each mobile station do not receive continuous voice at rates lower than the usual as mentioned below, and, hence, do not recognize a deterioration in sound quality.

In actual processing, the base station randomly selects a mobile station including the mobile station transmitting the emergency call, from mobile stations in its own service area at step SP41 using a traffic channel. It disregards mobile station selection by service grade because the base station selected the object of the traffic channel communication pause command. At subsequent step SP42, the base station issues the voice data rate restriction command to the selected mobile station. The voice data rate restriction command is, for example, a message including only the code, like with the traffic channel communication pause command. Since high-speed processing is required, the base station does not wait for an ACK signal.

The mobile station receiving the voice data rate restriction command should perform rate designation to prevent the mobile station from generating a voice data rate lower than usual, for example, the highest rate of voice data when the mobile station requests voice data from a vocoder 103 at step SP43. Namely, the base station issues the command to generate, for example, voice data up to 4 kbps if the base station uses a vocoder 103 of 8 kbps sampling frequency. This keeps system power capacity for the reverse link.

The base station also restricts the voice data rate of the base station vocoder (included in the communication unit 203 with the control center in FIG. 3). Hence, a margin of system power capacity is generated for the forward link, namely, communication from the base station to the mobile station, and for the reverse link from the mobile station to the base station. At subsequent step SP44, the base station issues the voice data rate restriction command until either the base station gets the calculated result that shows system power capacity is sufficient, or the mobile station moves out of the service area where it first received the communication data rate suppression command.

Based on the above structure, even if there is no empty traffic channel or if voice communication is impossible due to system power capacity saturation in a CDMA cellular system when a mobile station has transmitted an emergency call, the present invention enables an emergency message communication that can connect an emergency call at higher priority by pausing traffic channel communication in other mobile stations and reducing power use through use of a lower voice rate.

The present invention enables emergency message communication that burdens affected mobile station users the least, because mobile stations forced to pause in traffic channel communication can restart voice communication soon after one of the traffic channels becomes empty, and the voice rate restriction is affected at a level free of aural problems because the voice rate restriction changes an object each frame.

In the above embodiment, the present invention is applied to a CDMA cellular system. However, the present invention is not limited to this, but may be applied broadly to emergency call prioritization in other cellular systems, for example, TDMA cellular systems.

While the preferred embodiments of the invention have been described, it will be obvious to those skilled in the art that various changes and modifications may be achieved. Therefore, the appended claims are to be interpreted to cover all such changes and modifications as may fall within the true spirit and scope of.

What is claimed is:

1. An emergency communication method for communicating an emergency message using a cellular system to communicate voice and data among mobile stations in one of a plurality of service areas or terminal stations, the emergency message communication method comprising the steps of:

transmitting said emergency message in a mobile station of said cellular system;

saving terminal numbers of said mobile stations in said service area of a base station in a terminal register in said base station of said cellular system;

selecting at least one mobile station in nonemergency communication when said base station of said cellular system receives said emergency message;

restricting talking channel communication to said at least one mobile station in nonemergency communication in said base station of said cellular system by controlling suppression of a communication data rate between said at least one mobile station in nonemergency communication and said base station;

whereby the emergency message communication is enabled regardless of an empty talking channel shortage when said emergency message is communicated.

2. The emergency message communication method according to claim 1 wherein said step of controlling suppression of the data rate comprises the steps of:

suppressing a generated voice data rate of its own voice coding unit if the at least one mobile station receives a communication data rate suppression command; and restoring a generated voice data rate if the at least one mobile station receives a communication data rate suppression release command or moves out of said service area where the at least one mobile station received said communication data rate suppression command.

3. The emergency message communication method according to claim 1, wherein, said step of selecting a mobile station in nonemergency communication includes the steps of:

(a) transmitting a traffic channel communication pause command from the base station to the at least one mobile station in nonemergency communication;

(b) waiting for receipt by the base station of an acknowledgment signal from the at least one mobile station in response to the traffic channel communication pause command;

(c) if the base station does not receive the acknowledgment signal within a predetermined time, selecting a new mobile station in non-emergency communication and returning to step (a);

(d) continuing with the emergency communication method after the base station receives the acknowledgment signal.

4. The emergency message communication method according to claim 1, wherein in the step of restricting talking channel communication, the base station commands said at least one mobile station in nonemergency communication to pause in talking channel communication.

5. The emergency message communication method according to claim 4 wherein the step of pausing talking channel communication of said at least one mobile station in nonemergency communication comprises the steps of:

pausing talking channel communication and releasing a talking channel if the at least one mobile station in nonemergency communication receives a talking channel communication pause command; and restarting said talking channel communication if the at least one mobile station in nonemergency communication receives a talking channel communication release command or moves out of said service area where the at least one mobile station in nonemergency communication received the talking channel communication pause command.

6. The emergency message communication method according to claim 4 wherein said step of controlling suppression of the data rate comprises the steps of:

suppressing a generated voice data rate of its own voice coding unit if the at least one mobile station receives a communication data rate suppression command; and restoring a generated voice data rate if the at least one mobile station receives a communication data rate suppression release command or moves out of said service area where the at least one mobile station received said communication data rate suppression command.

7. The emergency message communication method according to claim 4, further comprising the step of vocally informing a user of the at least one mobile station in nonemergency communication when pausing in said talking channel communication that a talking channel has paused.

8. The emergency message communication method according to claim 4 wherein the step of pausing in said talking channel communication further comprises the step of issuing a talking channel communication pause release command to said at least one mobile station in nonemergency communication if a talking channel becomes empty.

9. An emergency message communication method for communicating an emergency message using a cellular system to communicate voice and data among mobile stations in one of a plurality of service areas or terminal stations, the emergency message communication method comprising the steps of:

transmitting a message from a mobile station of said cellular system;

saving terminal numbers of said mobile stations in said service area of a base station in a terminal register in the base station of said cellular system;

saving a plurality of codes in an emergency number register in said mobile station, said codes being used to determine whether or not an outgoing message should be designated as an emergency message;

comparing a code attached to the message of said mobile station of said cellular system to the plurality of codes in the emergency number register;

designating the message sent by said mobile station of said cellular system which matches any one of the plurality of codes in the emergency number register to be an emergency message, thus giving it a higher priority;

selecting at least one mobile station in nonemergency communication when said base station of said cellular system receives said emergency message, said step of including the steps of:

(a) transmitting a traffic channel communication pause command from the base station to the at least one mobile station in nonemergency communications, (b) waiting for receipt by the base station of an acknowledgment signal from the at least one mobile station in response to the traffic channel communication pause command, (c) if the base station does not receive the acknowledgment signal within a predetermined time, selecting a new mobile station in non-emergency communication and returning to step (a), and (d) continuing with the emergency communication method after the base station receives the acknowledgment signal; and restricting talking channel communication to said at least one mobile station in non-emergency communication in said base station of said cellular system;

whereby the emergency communication method enables communication regardless of an empty talking channel shortage when said emergency is communicated.

* * * * *